United States Patent [19]

Spendel

[11] Patent Number: 5,644,090

[45] Date of Patent: Jul. 1, 1997

[54] GAS METERS

[75] Inventor: Karl Damian Spendel, Nuremburg, Germany

[73] Assignee: Siemens Measurements Limited, Lancs, England

[21] Appl. No.: 305,868

[22] Filed: Sep. 14, 1994

[30] Foreign Application Priority Data

Sep. 29, 1993 [GB] United Kingdom ............... 9320042

[51] Int. Cl.$^6$ ........................................ G01F 1/66
[52] U.S. Cl. ........................................ 73/861.27
[58] Field of Search ........................................ 73/861.27

[56] References Cited

U.S. PATENT DOCUMENTS

| 3,575,050 | 4/1971 | Lynnworth | 73/861.27 |
|---|---|---|---|
| 3,874,233 | 4/1975 | Sanctuary et al. | 73/194 E |
| 4,103,551 | 8/1978 | Lynnworth | 73/861.27 |
| 4,483,202 | 11/1984 | Ogura et al. | 73/861.27 |

FOREIGN PATENT DOCUMENTS

| 0550333A1 | 7/1993 | European Pat. Off. . |
|---|---|---|
| 2222254 | 2/1990 | United Kingdom . |
| WO9000723 | 1/1990 | WIPO . |
| WO9300569 | 1/1993 | WIPO . |
| WO9306440 | 4/1993 | WIPO . |

OTHER PUBLICATIONS

A. von Jena et al., "Ultrasound gas–flow meter for household application," Sensors and Actuators, Jun.–Aug. 1993, pp. 135–140.

Primary Examiner—Richard Chilcot
Assistant Examiner—Jewel V. Artis
Attorney, Agent, or Firm—Keck, Mahin & Cate

[57] ABSTRACT

A gas meter includes a measuring tube through which gas to be supplied is fed. The tube includes two ultrasonic transducers between which ultrasonic signals are transmitted so that gas flow is measured in dependence upon the difference between the times of flight of ultrasonic signals transmitted therebetween in opposite directions. The gas flow is determined from the difference between the times of flight. A digital display is operative to indicate the volume of gas used, and an electrical power supply is used for driving the apparatus. The times of flight are measured by an electronic clock. Finally, a data interface facilitates the feeding of data to or from the meter.

7 Claims, 1 Drawing Sheet

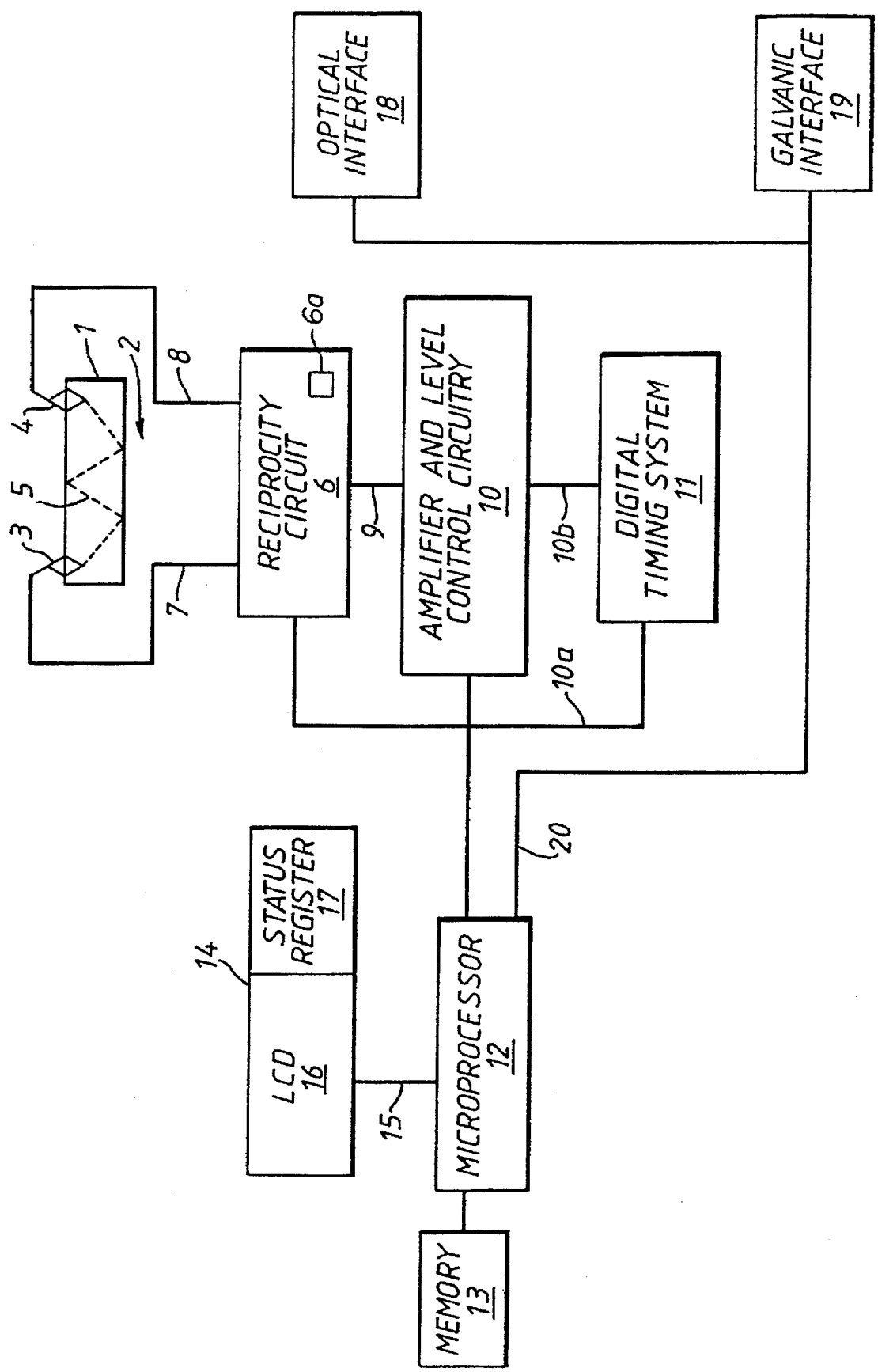

GAS METERS

BACKGROUND OF THE INVENTION

1. Field of the Invention

This invention relates to gas meters and more especially the invention relates to electrically operated gas meters.

2. Description of Related Art

Electrically operated gas meters per se are known and in this connection attention is directed towards our co-pending patent applications numbers PCT/EP93/00324, EP91902149.3, EP91900225.3, EP91902092.5, EP91902170.9, EP91902173.3. Whereas our co-pending patent applications relate to individual improvements to electrically operated gas meters, the present invention has in view, more especially but not exclusively, the provision of an electrically operated gas meter which comprises a novel combination of features whereby a plurality of advantages are contemporaneously provided.

SUMMARY OF THE INVENTION

It is an object of the present invention therefore to provide a gas meter which affords accurate gas measurement, reliable low maintenance operation, a digital display which serves for indicating the volume of gas used and/or for displaying data appertaining to operation of the meter, and data input/output interface means by means of which data can be fed to or from the meter.

It is further object of the present invention to provide a meter which tends to obviate or discourage attempts at fraud.

According to one aspect of the present invention we provide a gas meter which comprises a measuring tube through which gas to be supplied is fed, which tube includes two ultrasonic transducers between which ultrasonic signals are transmitted whereby gas flow is measured in dependence upon the difference between the time of flight of ultrasonic signals transmitted therebetween in opposite directions, means for measuring the gas flow in dependence upon the said difference between times of flight, a digital display operative to indicate the volume of gas used, an electrical power supply for driving the apparatus, an electronic clock in dependence upon which the said times of flight are measured and data interface means which facilitates the feeding of data to or from the meter.

BRIEF DESCRIPTION OF THE DRAWING

The accompanying drawing is a generally schematic block diagram of a gas meter according to one embodiment of the invention.

DESCRIPTION OF THE PREFERRED EMBODIMENT

Referring now to the drawing, an electrically operated gas meter comprises a tube 1 through which gas to be supplied is fed in a direction as indicated by an arrow 2. A pair of transducers 3 and 4 are fitted within the tube 1, the transducers 3 and 4 each being arranged to operate either in a transmit mode or in a receive mode, the arrangement being such that when one of the transducers 3 or 4 is operated in a transmit mode, the other of the transducers is operated in a receive mode, whereby in operation of the meter an acoustic signal is transmitted between the transducers alternately in opposite directions, i.e. alternately, with the direction of gas flow as indicated by the arrow 2, and against the direction of gas flow. The path taken by the acoustic signal, as it travels between the transducers 3 and 4, is indicated by a broken line 5. It can be seen from the drawing that the path as indicated by the line 5 has a 'W' configuration, the transducers being positionally arranged so that they afford a launch angle for the acoustic signal whereby the acoustic signal is suitably reflected to produce this result. In operation of the meter, gas flow is determined in dependence upon the difference between the times taken for an acoustic signal to travel in opposite direction between the transducers. To facilitate this mode of operation, a reciprocity circuit 6 is provided which includes an electronic change over switch 6a so that lines 7 and 8 which feed the transducers 3 and 4 can be used either for signal transmission or for signal reception purposes depending upon whether or not a particular one of the transducers 3 or 4 is being used in a transmit mode or In a receive mode. The reciprocity circuit 6 is connected via a line 9 to an amplifier and a signal level control circuit 10 and to a digital timing circuit 11 via a line 10a. The digital timing circuit 11 is also connected to the amplifier level control circuit by a line 10b and is operately associated with a quartz reference oscillator (not shown).

Energy for the transducers and for other electronic circuitry is provided by a battery (not shown). In order to extend battery life by minimizing electrical power consumption, a microprocessor circuit 12, is arranged to control operation of the transducers 3 and 4 and the associated amplifier level control circuit 10 so that measurements are taken at some arbitrary time during successive two second time slots. The time taken to complete a measurement operation is less than ⅛ of a second and thus it will be appreciated that the meter 'sleeps' for a greater part of each two second time slot, whereby power consumption is substantially reduced. Within each consecutive two second time slot, the precise moment at which a measurement is made is randomized, whereby the system is rendered highly fraud resistant. If, conversely, the transducers were operated with a predictable duty cycle, additional signals could be injected for fraudulent purposes whereby the gas flow as measured, could be arranged to appear much smaller than the gas flow which is actually obtained.

The amplifier level control circuitry 10 is arranged to operate under the control of a micro-processor 12. The microprocessor 12 is operatively associated with a memory unit 13 comprising an E²Prom. The micro-processor 12 is arranged to feed a digital display panel 14 via control lines 15. The digital display panel comprises a liquid crystal display having a display section 16 which indicates gas used and a display section 17 which, as will hereinafter be explained, provides a status indication.

In order to facilitate the injection of data into the meter or the extraction of data from the meter an interface arrangement is provided comprising an optical interface 18 via which data can be transmitted to or from the meter in the form of infra-red signals and a galvanic interface 19, which senses simply to handle electrical impulses, the interfaces 18 and 19 being arranged to the micro-processor 12 via lines 20.

In operation of the meter, during each duty cycle, the transducer 4 operating in a transmit mode is initially charged via the switch in the reciprocity unit 6 by charging circuitry. At a time determined randomly by the micro-processor 12 in dependence upon synchronization with the main dock, the transducer 4 is 'fired' to produce an acoustic signal which follows the path indicated by the broken line 5 to be received by the transducer 3 operating in a receive mode. The time taken for an acoustic signal to travel between the transducer 4 and the transducer 3 is measured by the digital timing circuit and this measurement represents the down-stream transmission time. When this measurement has been completed and the data collected, the transducer 3 operating now in a transmit mode is charged in the next randomly selected 2 second slot and thereafter discharged similarly to produce an acoustic pulse in the opposite direction which is subsequently received by the transducer 4 operating in a receive mode. The time taken for the acoustic signal to travel between the transducer 3 and the transducer 4 is measured and this time may be aptly described as the up-stream transmission time. A calculation is then made to determine the difference between the up-stream transmission time and the down-stream transmission time which provides an indication of gas flow rate through the tube 1. The gas flow rate is then integrated with time in the micro-processor 12 and the digital display 16 which indicates the gas used is appropriately incremented if appropriate. Randomization of the measurement during consecutive two second time slots is effected in accordance with the operation of a counter in the digital timing system which in effect produces a random count output in dependence upon which the precise moment of measurement is determined.

The status register 17 is arranged to provide a display indicating the occurrence of particular events as defined in the particular software. These events are characterized by different letters, flags or symbols and comprise, for example, a gas flow reversal, a change of battery, and the detection of air rather than gas as indicated by the time of transmission between the transducers of an acoustic signal. The events may be prioritized such that if a plurality of different events have occurred, certain specified events may be selected in order of priority for display in preference to others. Thus, if reverse gas flow conditions have been detected and a changed battery has been detected and the detection of air rather than gas in the tube 1 has also been detected, status information relating to reverse flow only, may for the time being, be indicated on the status register 17, assuming that this event has the highest priority. Moreover, a range of different codes may be assigned to indicate in respect of each event, the time at which it occurred.

Thus, for example the letter 'A' may be used to indicate reverse flow which after the passage of time can be arranged to change so as to advance progressively through the alphabet to the letter 'F'. Similarly, a change of battery may be indicated by the letter 'G' which may be arranged with the passage of time to advance progressively through the alphabet to the letter 'O'. In a similar way, if air rather than gas is detected, this may initially be indicated by the letter 'P' which with the passage of time may be changed to advance progressively through the alphabet to the letter 'Z'. It will be appreciated that the foregoing examples of flags or codes are given by way of example only and that any other coded system may alternatively be used.

Data appertaining to the foregoing events, as well as being displayed as appropriate, by the status register 17, are stored in the memory in micro-processor or E$^2$Prom unit 13 and are therefore retrievable consequent upon the injection of appropriate interrogation signals into either of the interfaces 18 and 19. Additionally, data appertaining to time, the date at which the battery was last changed, the date and time of fraud attempts, the number of days when negative gas flow was detected (as could be produced by reversing gas connections to the meter for fraud purposes) and various other parameters may be measured and stored in the memory unit 13, in such a manner that they can be retrieved by interrogation via one or other of the interfaces 18 and 19. Additionally, although not shown in the drawing, circuitry is arranged to embody a temperature sensor which provides details of current temperature. The micro-processor is arranged to be responsive to the temperature sensor so that pre-programmed data appertaining to current temperature (and/or maximum and/or minimum temperature) is operated upon during operation of the meter and/or registered and stored in the memory 13 so that it is also available when appropriate interrogatory signals are applied at either of the interfaces 18 or 19.

It will be apparent from the foregoing description that the meter as just before described, is very difficult to defraud without detection since a plurality of different parameters normally associated with fraud attempts are recorded and logged whereby the time and date of each event is stored for subsequent retrieval.

Although the present invention is concerned primarily with the provision of a novel combination of features which afford a plurality of advantages contemporaneously, one or more of the features hereinbefore described, may be individually patentable meritorious and accordingly may form the subject of a subsequent patent application or applications. Additionally, as will be readily apparent, various modifications may be made to the arrangement shown which may include the addition of any feature as described in our co-pending patent applications referred to above alone, or in combination.

I claim:

1. A gas meter comprising:

a measuring tube through which gas to be supplied is fed, said measuring tube including two ultrasonic transducers, one of which is arranged to transmit while the other is arranged to receive, and vice versa, and between which ultrasonic signals are transmitted whereby gas flow is determined in dependence upon a difference between times of flight of ultrasonic signals transmitted between the transducers in opposite directions, means for measuring the gas flow in dependence upon said difference between said times of flight, a digital display operative to indicate a volume of gas used, an electrical power supply, an electronic clock in dependence upon which said times of flight are measured, and data interface means for facilitating feeding of data to or from the meter, wherein a measurement to determine differences between the times of flight is carried out over a time period which is small with respect to a time period of successive time slots, whereby a power economy is thereby effected, and wherein the measurement is determined in dependence upon operation of a counter which forms a part of a digital timing system including a quartz reference, which counter is arranged to produce a random count output in dependence upon which a start of each measurement is determined.

2. A gas meter as claimed in claim 1, wherein a ratio between the time period which is small and the time period of successive time slots is greater than ten.

3. A gas meter as claimed in claim 1, wherein the digital display comprises two display sections, one of which provides a display indicative of the volume of gas used, and the other of which provides data appertaining to operational characteristics of the meter.

4. A gas meter as claimed in claim 3, wherein the operational characteristics of the meter appertain to predetermined events, each event of said predetermined events being characterized by display of any of a distinctive symbol, a number, a letter, a plurality of distinctive symbols, a plurality of numbers and a plurality of letters.

5. A gas meter as claimed in claim 4, wherein further data provides an indication of a time at which each event occurred.

6. A gas meter as claimed in claim 1, wherein the data interface means comprises a galvanic interface, by which electrical data signals can be transmitted to and from the meter, and an optical interface, connected in parallel with said galvanic interface, by which infra-red impulses can be transmitted to and from the meter.

7. A gas meter as claimed in claim 1, and further comprising a temperature sensor and means for effecting display, by said digital display, of data appertaining to at least one of minimum, current and maximum temperatures recorded thereby.

* * * * *